June 14, 1966  N. M. SULLIVAN  3,255,865
ACCUMULATING CONVEYOR SYSTEM HAVING
A PRESSURE-RELIEVING ARRANGEMENT
Filed Aug. 19, 1964  2 Sheets-Sheet 1
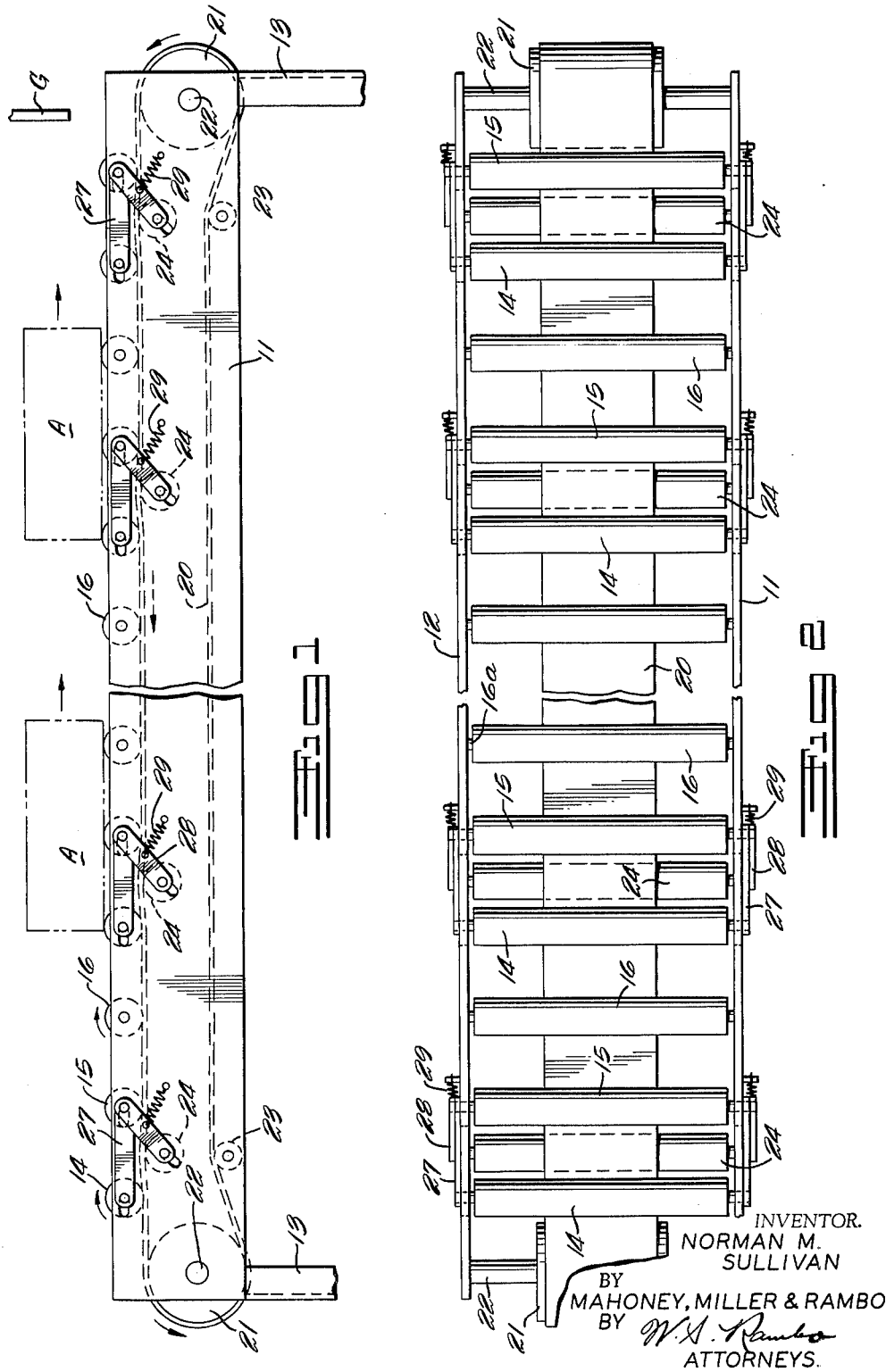
INVENTOR.
NORMAN M. SULLIVAN
BY MAHONEY, MILLER & RAMBO
BY
ATTORNEYS.

June 14, 1966
N. M. SULLIVAN
3,255,865
ACCUMULATING CONVEYOR SYSTEM HAVING
A PRESSURE-RELIEVING ARRANGEMENT
Filed Aug. 19, 1964
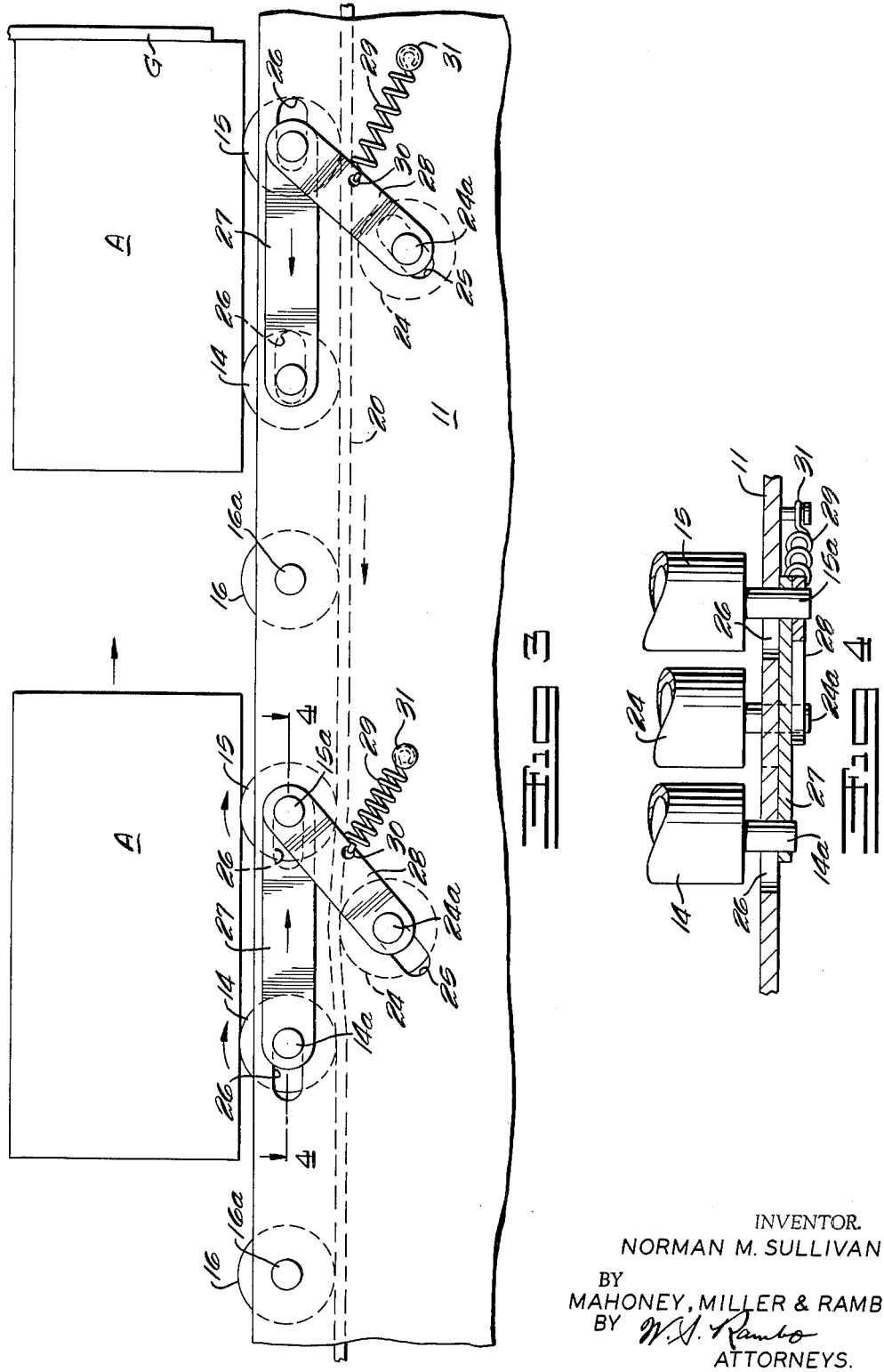
INVENTOR.
NORMAN M. SULLIVAN
BY
MAHONEY, MILLER & RAMBO
BY
ATTORNEYS.

United States Patent Office 3,255,865
Patented June 14, 1966

3,255,865
ACCUMULATING CONVEYOR SYSTEM HAVING A PRESSURE-RELIEVING ARRANGEMENT
Norman M. Sullivan, Rockford, Mich., assignor to The Alvey-Ferguson Company, Cincinnati, Ohio, a corporation of Ohio
Filed Aug. 19, 1964, Ser. No. 390,634
6 Claims. (Cl. 198—127)

This invention relates to an accumulating conveyor system having a pressure-relieving arrangement. It has to do, more particularly, with an accumulating conveyor system of the belt-driven, live-roller type, in which articles, such as cartons, are supported on the live rollers for conveyance from one position to another and are normally subject to stoppage or intermittent flow, particularly at the discharge end of the conveyor where they may be caused to accumulate. More specifically, the present invention is concerned with an improved arrangement for relieving or decreasing the frictional driving contact between the drive belt and groups of the article-supporting rollers of the conveyor in response to forces resulting from stoppage of one or more of the articles supported on and traversing the live rollers of the conveyor.

Pressure-relieving accumulating conveyors have been provided in the prior art and have included means for reducing the frictional contact between a belt driving member and the article-supporting rollers of the conveyor. One system uses the weight of the roller-supported articles for reducing this frictional contact but this arrangement is not desirable because it decreases the efficiency of the driving means. This is due to the fact that the weight of an article passing over a supporting roller or an associated sensing roller decreases the driving contact between certain of the article-supporting rollers and the driving belt whereas it is desirable to relieve or decrease the frictional driving contact between the supporting rollers and the belt only when there is a stoppage which interrupts the advancing movement of the articles on the conveyor. At this time, it is desirable to reduce the frictional contact between the driving belt and the supporting rollers so that the belt can continue in its movement and slip relative to the rollers to thereby reduce the heat and wear as compared to that which would be developed if the driving frictional contact were maintained. Another disadvantage of this prior art system is that the repeated actuation of the pressure-relieving mechanism each time an article moves thereover in itself produces considerable wear in the mechanism. Also, with this system the individual successive articles are sensed and the pressure-relieving mechanism is actuated by the weight of each sensed article but the release of the propelling force occurs in a zone or on an article trailing behind the leading sensed article. The result is that the propelling force is never released on the leading article, which is the first one to stop if there is jamming or stoppage of the conveyor, and consequently, there will develop excessive heat and wear on the propelling means, adjacent the leading article. Also, this arrangement produces what is termed singulation of the articles on the conveyor which means that the articles will be arranged, by the action of a preceding article releasing the propelling force on a succeeding article, in spaced relationship longitudinally of the conveyor. Thus, since with this prior art system, the articles will not be arranged on the conveyor in closely spaced or contacting sequence, the capacity of the conveyor is reduced considerably. This reduction in capacity not only occurs from the above-explained action of singulation but also from the reduction in propelling force brought about, as indicated above, by mere passage of the articles along the conveyor.

It is the main object of this invention to provide an accumulating conveyor system of the general type indicated wherein means is provided for relieving or decreasing the frictional driving force on the article-supporting rollers solely in response to stoppage of one or more of the articles supported by the rollers.

Another object of this invention is to provide an accumulating conveyor system wherein the roller driving or propelling force is decreased or relieved in response to stoppage of an article only and affects the driving or propelling force only on the rollers which support the article or articles involved in the stoppage.

A further object of this invention is to provide a conveyor system in which the force-relieving arrangement referred to functions as a result of stoppage of one or more preceding articles involved in a stoppage and will not affect succeeding lengths of the conveyor until articles are stopped thereon.

Another object of this invention is to provide a conveyor of the type indicated wherein the weight of the articles passing along the conveyor will not actuate the pressure-relieving arrangement but this actuation occurs only as a result of the braking force created between a stopped article and one or more associated driven supporting rollers with the result that during normal operation of the conveyor there will be no detraction from the efficiency of the roller driving or propelling means.

Still another object of this invention is to provide a conveyor system of the type indicated wherein the driving pressure or propelling pressure relieving means will not interfere with contiguous positioning or closely spacing of the successive articles on the conveyor and, therefore, will not detract from the normal capacity of the conveyor.

Another object of this invention is to provide a pressure-relieving arrangement of the type indicated which is of a very simple structure and is composed of a minimum number of parts subject to wear, which will, therefore, be inexpensive to incorporate in an accumulating conveyor system and will be simple and inexpensive to maintain.

Various other objects will be apparent from the following description and the attached drawings.

More specifically, according to this invention there is provided an accumulating conveyor system which includes a plurality of transversely disposed rollers forming an upper conveyor surface which is usually substantially horizontally disposed for supporting articles for movement longitudinally of the conveyor in contiguous or closely spaced sequence. The rollers are propelled or driven by a continuously driven, endless flexible member, such as a driving belt, disposed below the rollers and extending longitudinally of the conveyor. The upper run of this driving member is positioned for frictional engagement or contact with the article-supporting rollers so as to drive them to advance the supported articles longitudinally of the conveyor in a direction opposite to the direction of continuous movement of the upper run of the driving member. As a part of the pressure-relieving arrangement of this invention, in case a stoppage of the roller-supported articles occurs, the upper run of the endless driving member is mounted for vertical movement relative to said rollers to vary the frictional driving contact therebetween. Also, as a part of this pressure-relieving arrangement, means is provided in cooperation with the article-supporting rollers, which is actuated solely in response to the braking force created between the supporting roller and an article supported thereby, which is stopped in its advancing movement, to set up reaction forces for controlling said relative vertical movement to decrease the coefficient of friction or frictional contact between that roller and the upper run of the driving member.

The accompanying drawings illustrate an accumulating conveyor system in which a preferred form of pressure-relieving arrangement is incorporated in accordance with this invention. However, it is to be understood that this form is given as an example only and that specific variations in structure may be made without departing from basic principles of this invention.

In these drawings:

FIGURE 1 is a side elevational view of an accumulating conveyor system showing means applied thereto in accordance with this invention for relieving the roller driving or propelling pressure when a stoppage in movement of articles along the conveyor occurs.

FIGURE 2 is a plan view of the conveyor system shown in FIGURE 1.

FIGURE 3 is an enlargement in side elevation of a portion of the conveyor system shown in FIGURE 1 to illustrate more clearly the pressure-relieving arrangement.

FIGURE 4 is a horizontal sectional view taken substantially along line 4—4 of FIGURE 3.

With reference to the drawings, there is illustrated therein an accumulating conveyor in which is incorporated, according to this invention, a preferred arrangement for relieving the article-supporting roller driving or propelling pressure when a stoppage in the advancing movement of one or more articles occurs. The conveyor system is shown as comprising a pair of elongated frame members 11 and 12 which are illustrated as being in the form of flat plates disposed on edge in upright position but which may be in the form of channels or beams or other suitable frame members. These members 11 and 12 extend the full length of the conveyor system and are disposed in laterally spaced parallel relationship. They may be supported at a suitable level by leg members 13 or in any other suitable manner.

Between the frame members 11 and 12 there are provided transversely disposed article-supporting rollers which are preferably arranged in pairs comprising rollers 14 and 15 with individual rollers 16 disposed between adjacent pairs. Thus, the rollers 14, 15 and 16 are disposed transversely between the frame members 11 and 12 in longitudinally spaced relationship. It will be apparent hereinafter that the rollers 16 are supported in fixed longitudinal position whereas the rollers 14 and 15 of each pair are supported for longitudinal shifting movement. The rollers 14, 15 and 16 include the respective supporting shafts or axles 14a, 15a and 16a which project from opposite ends thereof and which are suitably mounted in the frame plates 11 and 12. All of the rollers 14, 15 and 16 are supported by the plates 11 and 12, as indicated best in FIGURE 3, in such a manner that their uppermost surfaces are located above the level of the upper edges of these plates so that they will serve to support various articles, for example, the cartons A indicated in the drawings. These articles are adapted to move along the rollers to a suitable point where they may be stopped by any suitable gate arrangement G whenever it is desired to accumulate articles on the conveyor.

The rollers 14, 15 and 16 are driven or propelled by an endless flexible propelling or driving member which is illustrated in the drawings as being a belt 20. This belt 20 may pass around suitable supporting drums 21 disposed at opposite ends of the conveyor and supported by transverse shafts 22 carried by the frame plates 11 and 12. One of these drums 21 may be driven continuously by suitable means, for example, by an electric motor and a suitable gear reduction unit which are not shown. The upper run of this belt 20 is so disposed that it can engage the lower surface of the rollers 14, 15 and 16 to drive such rollers. If the belt is driven in the direction indicated by the arrows in FIGURE 1, the upper run of the belt will travel to the left of that figure and when engaging the article-supporting rollers, will drive them in a clockwise direction so as to move the articles A toward the gate G in a direction opposite to the direction of movement of the upper run of the belt. The upper run of the belt is movable or flexible vertically relative to the rollers 14, 15 and 16 so as to vary the coefficient of friction or driving pressure therebetween and adjusting means is provided for this upper run. The lower run of the belt may be engaged by tensioning rollers 23 which may be adjustable if desired.

The adjusting means to control the vertical flexing movement of the upper run of the belt 20 relative to the cooperating article-supporting and driving rollers, includes a belt-adjusting roller 24 associated with each pair of supporting rollers 14 and 15. Each roller 24 is located below the upper run of the belt substantially midway longitudinally of the associated pair of rollers 14 and 15. Each roller 24 is rotatably carried by a shaft or axle 24a which projects from the opposed ends thereof into guide slots 25 that are inclined downwardly and rearwardly relative to the direction of movement of the articles A. Thus, the rollers 24 can move in a direction having both a vertical and a horizontal component and this movement is used for adjusting the upper run of the belt 20 vertically relative to the rollers 14 and 15.

As previously indicated, the rollers 14 and 15 are mounted for movement longitudinally of the conveyor. These rollers are rotatably carried by the respective shafts or axles 14a and 15a and the oppositely projecting ends of these shafts extend into the slots 26 formed in the side frame plates 11 and 12. These slots are elongated and extend horizontally only. Thus, the rollers 14 and 15 can move horizontally relative to the frame plates 11 and 12, that is, longitudinally of the conveyor. In order that the rollers 14 and 15 of each pair will move together as a unit, the opposite ends of the respective shafts 14a and 15a are connected together by links 27. It will be noted in FIGURE 4 that the shafts 14a and 15a extend through the slots 26 outwardly beyond the associated plate 11 or 12 and through openings formed in the ends of the link 27 which is fixed on such ends. Thus, the link 27 is disposed outside the associated side plate and is slidable relative thereto. The shaft 15a of the leading rollers 15 of the pair has mounted on its outer end for movement about the axis thereof an angularly disposed lever 28 which extends downwardly and rearwardly relative to the direction of movement of the articles A on the conveyor. The lower end of this lever 28 receives the adjacent projecting end of the shaft 24a of the belt-adjusting roller 24 which projects through the inclined slot 25. Thus, the article-supporting rollers 14 and 15 are connected together for longitudinal or horizontal movement and this pair of rollers, in turn, is connected to the roller 24 for controlling the angular movement thereof. Consequently, there is a cluster of three rollers which are connected together for simultaneous adjustment and any number of these clusters may be spaced longitudinally along the conveyor.

A tension spring 29 is connected to each lever 28 at a point 30 intermediate its end and the other end of this spring is anchored at 31 to the associated side plate 11 or 12. These springs 29 pull the levers 28 forwardly relative to the direction of movement of the articles A so that the shafts 14a and 15a are normally positioned in the forward ends of the slots 26. This, in turn, exerts an upward and forward pull on the levers 28 which pulls the roller shaft 24a to the upper ends of the inclined slots 25 and causes the belt-adjusting roller 24 to move vertically against the lower surface of the upper run of the belt and bow it upwardly between the associated rollers 14 and 15 causing it to press tightly thereagainst. When an article A supported by either or both of the rollers 14 and 16 of a pair is stopped, the moving upper run of the belt 20 tends to continue to drive these rollers 14 and 15 but friction of the rollers 14 and 15 rotating beneath the article creates a braking action on such rollers which sets up a reaction force that tends to move the roller shafts 14a and 15a rearwardly in their respective slots 26. The rollers of the pair move together because of the connecting links 27. This rearward movement produces a downward and rearward movement on the levers 28 which forces the shaft 24a downwardly in the inclined slots 25. This lowers the belt-adjusting roller 24 and permits the upper run of the belt 20 to slacken and move downwardly relieving the pressure or coefficient of friction between the belt and the article-supporting rollers 14 and 15. If the stopped article begins to move, the reaction force is eliminated and the springs 29 will exert a forward pull on the levers 28 and a forward pull on the pair of connected rollers 14 and 15, returning their shafts 14a and 15a to their normal positions which are at the forward ends of the respective horizontal slots 26.

The rollers 16 are merely extra supporting rollers which are carried rotatably on the axles 16a that extend into openings formed in the opposed side frame plates 11 and 12. It is desirable to have these rollers 16 between the adjacent clusters of rollers, each comprising the article-supporting rollers 14 and 15 and the belt-adjusting roller 24. However, if these clusters are sufficiently close, it is not necessary to use the rollers 16. If the spacing of the clusters is greater, it may be desirable to use more than one of the rollers 16 between succeeding clusters. Obviously, the adjustment of the belt 20 vertically to vary its pressure of contact with the rollers 14 and 15 will have a similar but less pronounced effect on the adjacent rollers 16.

It will be apparent that with this pressure control arrangement slippage is permitted between the upper run of the drive belt 20 and the article-supporting rollers in response to the stoppage of an article thereon. So long as the articles are free to progress over the conveyor, the springs 29 function to hold the shiftable article-supporting rollers 14 and 15 in their forward positions with the belt-adjusting rollers 24 maintaining the belt 20 upwardly in tight contact wtih the article-supporting rollers. However, when one or more of the articles are stopped, the supporting rollers 14 or 15 immediately beneath the stopped article shift slightly rearwardly to thus drop the associated adjusting rollers 24 slightly downwardly to relieve the drive engagement between the belt and the article-supporting rollers. This permits articles A, for example, to be stopped by a gate G so as to accumulate at the discharge end of the conveyor without creating excessive pressures and friction which tend either to collapse the articles or cause extreme wear on the drive belt.

It will be apparent that this invention provides a conveyor including the transversely disposed longitudinally spaced supporting rollers upon which the articles are supported for longitudinal movement. These rollers are driven to move the articles in a selected direction by means of an endless flexible member which frictionally engages therewith. The coefficient of friction between the flexible driving member and the rollers is varied by mounting the supporting rollers for bodily movement or displacement in a direction generally opposite to the direction of movement of the articles. Means is connected with these displaceable rollers which is operable to decrease the coefficient of friction between the driving member and the rollers in response to the displacement of the rollers. The rollers are only displaced to operate the means for decreasing the contact between the driving member and the rollers when an article is stopped and sets up a braking action which creates, reaction forces to cause rearward displacement of the rollers. The decrease in the coefficient of friction between the driving member and the article-supporting rollers occurs at the rollers beneath the article or articles which are stopped and consequently will relieve the driving pressure beneath the leading article stopped without affecting succeeding articles until they are actually stopped when the driving pressure on the supporting rollers therebeneath will also be relieved. Thus, the articles on the conveyor can be in contiguous succeeding relationship. The weight of the supported articles does not detract from the driving force. The pressure-relieving arrangement is extremely simple and inexpensive both to manufacture and maintain.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A conveyor comprising a plurality of transversely disposed longitudinally spaced rollers forming an upper conveyor surface for supporting articles for movement longitudinally of the conveyor along a selected plane, means for driving said rollers in a direction to move said articles longitudinally in a selected direction and comprising a driven endless flexible member extending longitudinally of the conveyor below the rollers and having an upper run underlying the rollers and disposed for frictional engagement with the rollers at their lower sides with the upper run moving continuously in a direction opposite to the direction of movement of the articles, guide means supporting said rollers for bodily displacement in a direction generally the same as the direction of movement of said upper run of the flexible member but opposite to the direction of movement of the articles supported on said rollers and in a plane substantially parallel to said selected plane, said guide means preventing said rollers from moving in a direction normal to the said conveyor surface, and means connected to said rollers and operable upon movement thereof to cause movement of said upper run of the flexible member relative to said rollers to decrease the coefficient of friction between said upper run and said rollers.

2. A conveyor according to claim 1 in which said means for supporting said rollers comprises roller-carrying shafts which are disposed in substantially horizontal slots formed in side frame supports that have roller-shaft guiding edges that extend longitudinally of the conveyor in a plane substantially parallel to said selected plane, said endless flexible member being in the form of a belt, said last-named means comprising means connected to said rollers and to belt-adjusting members which engage said upper run of the belt.

3. A conveyor according to claim 2 in which means is connected to said roller shafts for biasing them into the forward ends of said slots relative to the direction of movement of the articles on the supporting rollers, said belt-adjusting members comprising pressure-applying rollers disposed beneath the upper run of the belt for lifting it into frictional contact with said article-supporting rollers, said pressure-applying rollers being carried by shafts mounted in inclined slots in said side frame supports, said slots being inclined so as to extend downwardly and rearwardly relative to the direction of movement of said articles.

4. A conveyor according to claim 3 in which said article-supporting rollers are disposed in pairs each comprising two longitudinally space transverse rollers above the upper run of the belt, one of said pressure-applying rollers being provided intermediate the two rollers and below the upper run of the belt.

5. A conveyor according to claim 4 in which the two rollers of each pair are connected together for bodily movement by connecting links connected to their respective shafts, and levers are connected between the shaft of the leading roller and that of the pressure-applying roller for controlling the position of the latter shaft in said inclined slots.

6. A conveyor according to claim 5 in which said biasing means comprises springs connected between said levers and the associated side frame supports.

References Cited by the Examiner
UNITED STATES PATENTS

| | | | |
|---|---|---|---|
| 2,985,278 | 5/1961 | McKnight et al. | 198—160 |
| 3,115,238 | 12/1963 | Holm et al. | 198—160 X |
| 3,199,657 | 8/1965 | Harrison | 198—127 |

HUGO O. SCHULZ, *Primary Examiner.*

R. E. KRISHER, *Assistant Examiner.*